United States Patent
Seong

(10) Patent No.: US 9,962,838 B2
(45) Date of Patent: May 8, 2018

(54) INSPECTION SYSTEM AND INSPECTION METHOD FOR ELECTRONIC DEVICE OF VEHICLE

(71) Applicant: HYUNDAI MOTOR COMPANY, Seoul (KR)

(72) Inventor: Haseung Seong, Daejeon (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 14/836,731

(22) Filed: Aug. 26, 2015

(65) Prior Publication Data

US 2016/0271801 A1 Sep. 22, 2016

(30) Foreign Application Priority Data

Mar. 20, 2015 (KR) .................. 10-2015-0039221

(51) Int. Cl.
G05B 19/04 (2006.01)
G05B 19/18 (2006.01)
(Continued)

(52) U.S. Cl.
CPC ............. *B25J 9/1697* (2013.01); *B25J 11/00* (2013.01); *B25J 15/0019* (2013.01);
(Continued)

(58) Field of Classification Search
CPC ...... B25J 11/00; B25J 15/0019; B25J 9/1697; G01M 17/00; Y10S 901/44; Y10S 901/31; Y10S 901/02; Y10S 901/47
See application file for complete search history.

(56) References Cited

U.S. PATENT DOCUMENTS

2003/0214485 A1* 11/2003 Roberts ............... G06F 3/0418
345/173
2008/0068229 A1* 3/2008 Chuang ............... G06F 3/0418
341/34
(Continued)

FOREIGN PATENT DOCUMENTS

JP 2013-050468 A 3/2013
JP 2013050468 A * 3/2013
(Continued)

OTHER PUBLICATIONS

English translate for reference KR100901389.*
English translation for reference JP2013050468.*

*Primary Examiner* — Rachid Bendidi
(74) *Attorney, Agent, or Firm* — McDermott Will & Emery LLP

(57) ABSTRACT

An inspection system for an electronic device of a vehicle includes a vision camera detecting a front state. An ultrasonic wave radiator, which is disposed at a lower side of the vision camera, radiates ultrasonic waves forwardly and senses ultrasonic waves reflected from a front obstacle. A touch screen operating finger moves forwardly and backwardly to touch a touch screen. A button operating finger is mounted to one side of the touch screen operating finger to press a button. A position of a body is controlled in a three-dimensional coordinate system such that the vision camera, the ultrasonic wave radiator, the touch screen operating finger, and the button operating finger are mounted thereto. A driving unit is configured to push forwardly or pull backwardly the touch screen operating finger and the button operating finger.

13 Claims, 3 Drawing Sheets

(51) Int. Cl.
  *B25J 9/16*       (2006.01)
  *B25J 11/00*      (2006.01)
  *B25J 15/00*      (2006.01)
  *G01M 17/00*      (2006.01)

(52) U.S. Cl.
  CPC .......... *G01M 17/00* (2013.01); *Y10S 901/02* (2013.01); *Y10S 901/31* (2013.01); *Y10S 901/44* (2013.01); *Y10S 901/47* (2013.01)

(56) References Cited

U.S. PATENT DOCUMENTS

| | | | | |
|---|---|---|---|---|
| 2012/0065780 | A1* | 3/2012 | Yamaguchi | B25J 15/0206 |
| | | | | 700/259 |
| 2012/0146956 | A1* | 6/2012 | Jenkinson | G06F 3/0418 |
| | | | | 345/178 |
| 2012/0153652 | A1* | 6/2012 | Yamaguchi | B25J 15/0028 |
| | | | | 294/86.4 |
| 2012/0280934 | A1* | 11/2012 | Ha | G06F 11/2221 |
| | | | | 345/174 |
| 2013/0345864 | A1* | 12/2013 | Park | B25J 9/1612 |
| | | | | 700/248 |
| 2014/0267691 | A1* | 9/2014 | Humphrey | G06T 7/001 |
| | | | | 348/125 |
| 2014/0309775 | A1* | 10/2014 | Jenkinson | G06F 3/0418 |
| | | | | 700/250 |
| 2016/0167238 | A1* | 6/2016 | Matthews | G01M 99/008 |
| | | | | 73/118.01 |

FOREIGN PATENT DOCUMENTS

| | | | |
|---|---|---|---|
| KR | 10-2007-0077909 A | | 7/2007 |
| KR | 100901389 | * | 5/2009 |
| KR | 10-0901389 B1 | | 6/2009 |

\* cited by examiner

INSPECTION SYSTEM AND INSPECTION METHOD FOR ELECTRONIC DEVICE OF VEHICLE

CROSS-REFERENCE TO RELATED APPLICATION

This application claims the benefit of priority to Korean Patent Application No. 10-2015-0039221 filed in the Korean Intellectual Property Office on Mar. 20, 2015, the entire content of which is incorporated herein by reference.

TECHNICAL FIELD

The present disclosure relates to an inspection system for an electronic device of a vehicle which automatically inspects a function of an operating button to improve working efficiency of a worker.

BACKGROUND

A vehicle includes various electric devices having a touch panel, a radio button, an air con button, and the like inside the vehicle.

Particularly, as an electric controller (ECU) of the vehicle has become diversified, buttons for controlling the various electric devices are provided at a steering wheel, a dashboard, and a door trim, and processes for inspecting a button operation have been increased.

In general, in order to inspect an operation of a button inside a vehicle, a worker has to open a vehicle door to be seated and operate the button provided at a dashboard, a door trim, or the like.

However, since the worker has to inspect manually, inspection items may be missing or the inspection may be non-uniformly performed. Thus, faulty buttons may often be found. In addition, working efficiency may due to the manual inspection, and further inputting, evaluating, and automatically updating data regarding an inspection result may be inconvenient.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an inspection system for an electronic device of a vehicle having advantages of efficiently inspecting an operation of a button or a touch screen to operate the electronic device, automatically inspecting and detecting poor operation of the button or the touch screen, improving quality of the vehicle, and reducing a load of a worker to decrease manufacturing cost and time.

An inspection system for an electronic device of a vehicle according to an exemplary embodiment of the present inventive concept may include a vision camera detecting a front state. An ultrasonic wave radiator, which is disposed at a lower side of the vision camera, forwardly radiates ultrasonic waves and senses ultrasonic waves reflected from a front obstacle. A touch screen operating finger moves forwardly and backwardly to touch a touch screen. A button operating finger is mounted to one side of the touch screen operating finger to push a button. A position of a body is controlled in a three-dimensional coordinate system such that the vision camera, the ultrasonic wave radiator, the touch screen operating finger, and the button operating finger are mounted thereto. A driving unit is configured to push forwardly or pull backwardly the touch screen operating finger and the button operating finger. The inspection system may further include a lamp mounted to a lower front side of the body and radiating light forwardly. The button operating finger and touch screen operating finger are parallel with each other at an upper front side of the lamp.

The inspection system may further include a controller configured to control the vision camera, the ultrasonic wave radiator, the lamp, and the driving unit and to sense the front obstacle according to the reflected ultrasonic waves sensed by the ultrasonic wave radiator. The driving unit may include a vacuum proportional control valve receiving and transmitting driving air according to a supplied current. A solenoid valve is disposed at a downstream side of the proportional control valve to open/close a passage through which the driving air passes. A finger cylinder respectively moves the button operating finger or the touch screen operating finger by the driving air supplied through the solenoid valve.

The controller may control a position of the robot arm to move the body toward the vehicle, and adjust a position of the body through the vision camera to forwardly or backwardly move the button operating finger or the touch screen operating finger according to control of the driving portion.

The inspection system may further include a load cell detecting a load applied to the button operating finger or the touch screen operating finger.

The controller may move the button operating finger or the touch screen operating finger backwardly by the load detected in the load cell.

The inspection system may further include a finger back detecting sensor detecting a backward motion of the button operating finger or the touch screen operating finger.

The proportional control valve may proportionally increase or decrease a pressure of the supplied driving air according to the supplied current.

The touch screen operating finger and the button operating finger may have a size and a shape according to a worker's finger, and the touch screen operating finger may operate by a force according to a worker's force.

The touch screen operating finger and the button operating finger may be made of a rubber, a silicone, or a plastic material.

An inspection method for an electronic device of a vehicle according to an exemplary embodiment of the present inventive concept may include moving an inspection system using a robot arm by a controller. The controller detects a front obstacle by sensing ultrasonic waves. The controller adjusts a position of a touch screen or a button to a reference position using a vision camera. The controller operates the touch screen or the button by pressing with a touch screen operating finger or a button operating finger. The controller detects an operation of the touch screen or the button. The controller moves the touch screen operating finger or the button operating finger backwardly after detecting the operation.

The inspection method may further include radiating light by a lamp.

The inspection method may further include detecting a load applied to the touch screen operating finger or the button operating finger by a load cell, and determining the operation of the touch screen or the button as the load.

DETAILED DESCRIPTION OF THE EMBODIMENTS

An exemplary embodiment of the present inventive concept will hereinafter be described in detail with reference to the accompanying drawings.

Figure 1:
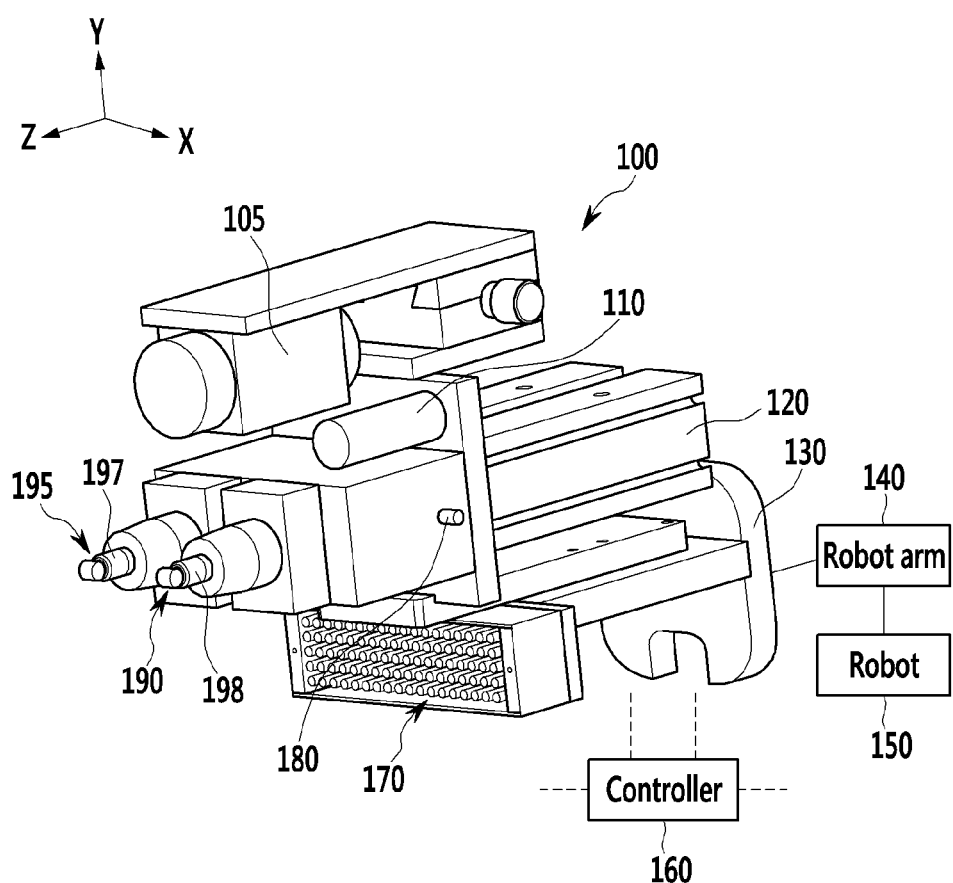
FIG. 1 is a perspective view of an inspection unit for electronic device of a vehicle according to an exemplary embodiment of the present inventive concept.

FIG. 1 is a perspective view of an inspection system for electronic device of a vehicle according to an exemplary embodiment of the present inventive concept.

Referring to FIG. 1, an inspection system 100 for an electronic device of a vehicle includes a vision camera 105, an ultrasonic wave radiator 110, a body 120, a bracket 130, a robot arm 140, a robot 150, a controller 160, a lamp 170, a finger back detecting sensor 180, a button operating finger 190, a touch screen operating finger 195, a first load cell 197, and a second load cell 198. Further, an ultrasonic sensor (not shown) may be provided for sensing ultrasonic waves radiated from the ultrasonic wave radiator 110.

The lamp 170 is disposed at a lower front side of the body 120. The lamp 170 radiates light forwardly to light a inspection portion and a moving space. All structures and methods for providing illumination such as an LED can be applied to the lamp 170.

The button operating finger 190 and the touch screen operating finger 195 are parallel with each other at an upper front side of the lamp 170. The touch screen operating finger 195 may move forwardly or backwardly to operate a touch screen of the vehicle at a predetermined position. The button operating finger 190 may move forwardly or backwardly to operate a button of a vehicle at a reference position.

The first load cell 197 and the second load cell 198 are connected to the touch screen operating finger 195 and the button operating finger 190 to detect a force with which the touch screen operating finger 195 and the button operating finger 190 push the touch screen and the button.

The finger back detecting sensor 180 is installed at a rear side of the button operating finger 190 and the touch screen operating finger 195, so as to detect a backward motion of the button operating finger 190 and the touch screen operating finger 195. The ultrasonic wave radiator 110 is disposed at an upper side of the finger back detecting sensor 180 to radiate ultrasonic waves to an obstacle existing ahead thereof. The ultrasonic sensor (not shown) which is disposed near the ultrasonic wave radiator 110 senses ultrasonic waves reflected from the obstacle and transmits the information about the reflected ultrasonic waves to the controller 160. Herein, the ultrasonic wave radiator 110 may include the ultrasonic sensor.

The vision camera 105 is disposed at an upper side of the ultrasonic wave radiator 110 to detect a front state by a screen and transmit the information about the front state to the controller 160.

The controller 160 controls a motion of the robot arm 140 in a three-dimensional space by the robot 150 such that the body 120 rotates or moves by moving the bracket 130. The controller 160 controls further the lamp 170 and detects a backward motion of the touch screen operating finger 195 and the button operating finger 190 by the finger back detecting sensor 180 to push the touch screen operating finger 195 or the button operating finger 190 for operating the touch screen or the button if a reference condition is satisfied.

In addition, the controller 160 detects the state of operating the touch screen and the button by a pressure signal transmitted from the first load cell 197 and the second load cell 198, controls the ultrasonic wave radiator 110 such that ultrasonic waves radiate forwardly, senses an obstacle by the ultrasonic sensor, and adjusts a position of the body 120 through the vision camera 105.

In the present disclosure, the touch screen operating finger 195 or the button operating finger 190 may have a size and a shape to correspond with a worker's finger. Further, the touch screen operating finger 195 and the button operating finger 190 operate by a force to correspond with a worker's force for operating.

The touch screen operating finger 195 and the button operating finger 190 may be made of a rubber, silicone, or plastic material.

The controller 160 includes at least one microprocessor driven by a predetermined program which may include a series of commands for performing an inspection method for electronic device of a vehicle according to an exemplary embodiment of the present inventive concept.

Figure 2:
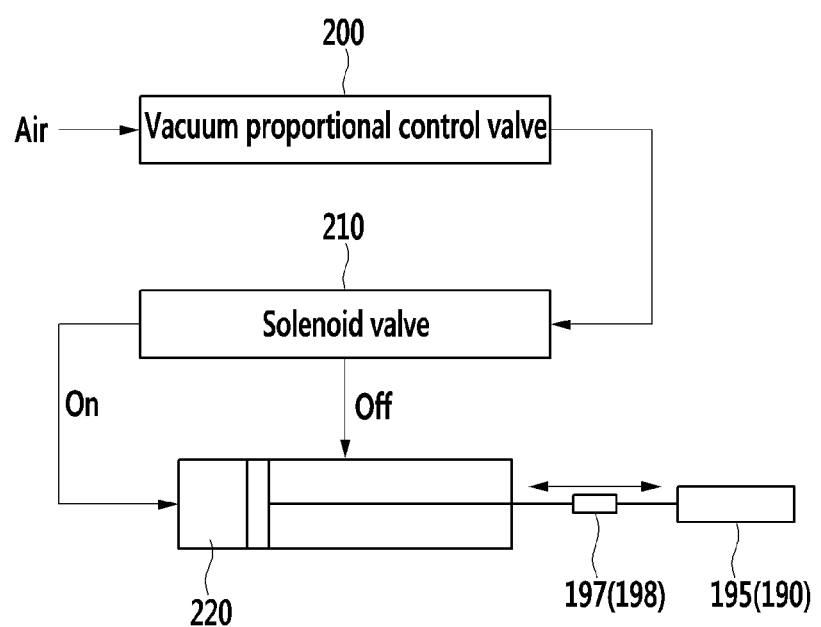
FIG. 2 is a schematic diagram showing an operation air supplying method in an inspection system for electronic device of a vehicle according to an exemplary embodiment of the present inventive concept.

FIG. 2 is a schematic diagram showing an operation air supplying method in an inspection system for an electronic device of a vehicle according to an exemplary embodiment of the present inventive concept.

Referring to FIG. 2, the inspection system for an electronic device of a vehicle includes a vacuum proportional control valve 200, a solenoid valve 210, a finger cylinder 220, the touch screen operating finger 195, and the button operating finger 190.

The vacuum proportional control valve 200 is proportionally controlled by supplied current/voltage so as to control pressure of air supplied to the solenoid valve 210 such that the solenoid valve 210 is on/off controlled to forwardly or backwardly move the finger cylinder 220.

The touch screen operating finger 195 or the button operating finger 190 are disposed at a driving rod of the finger cylinder 220, and the first load cell 197 and the second load cell 198 are mounted in the driving rod. The construction and type of the first and second load cells 197 and 198 that are provided at the driving rod are well-known to a person of ordinary skill in the art, so a further detailed description thereof will be omitted.

The controller 160 controls the vacuum proportional control valve 200 so as to supply driving air having a predetermined pressure to the solenoid valve 210 and on/off control the solenoid valve 210 such that the driving rod moves forwardly or backwardly.

Figure 3:
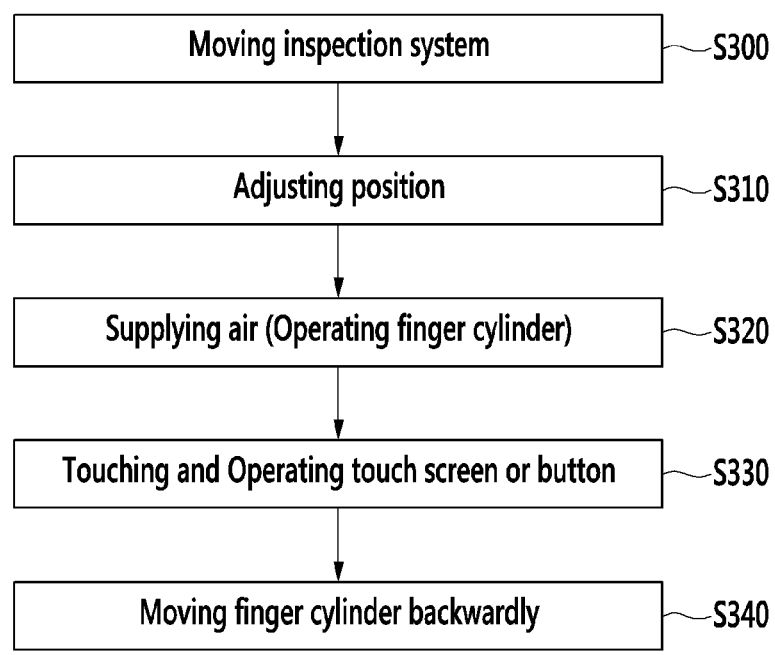
FIG. 3 is a flowchart of an inspection performing method by an inspection system for electronic device of a vehicle according to an exemplary embodiment of the present inventive concept.

FIG. 3 is a flowchart of an inspection method by an inspection system for an electronic device of a vehicle according to an exemplary embodiment of the present invention.

Referring to FIG. 3, the controller 160 controls the robot arm 140 of the robot 150 such that the body 120 moves into a vehicle in a three-dimensional space at step S300. The controller 160 further precisely adjusts a position of the body 120 according to a front state through the vision camera 105 and the ultrasonic wave radiator 110 at step S310.

The controller 160 controls the vacuum proportional control valve 200 and the solenoid valve 210 so as to supply the driving air to the finger cylinder 220 at step S320. Then, the controller 160 operates a touch screen or a button of the vehicle and determines a state in which the touch screen or the button are pushed through the first load cell 197 and the second load cell 198 at step S330.

Further, the controller 160 controls the driving air such that the finger cylinder 220 moves backwardly, and the body 120 returns to an original position at step S340.

According to the present disclosure, the vision camera 105 ensures front vision for inspecting, the ultrasonic wave radiator 110 effectively detects a front obstacle, and the lamp 170 effectively lights a front area in the inspection system and method for an electronic device of a vehicle. In addition, a switch or a touch screen may be easily operated by moving the button operating finger 190 and the touch screen operating finger 195, and an operating force may be controlled by the load cells 197 and 198.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An inspection system for an electronic device of a vehicle, comprising:
   a vision camera detecting a front state;
   an ultrasonic wave radiator, which is disposed at a lower side of the vision camera, radiating ultrasonic waves forwardly and sensing ultrasonic waves reflected from a front obstacle;
   a touch screen operating finger moving forwardly and backwardly to touch a touch screen;
   a button operating finger mounted to one side of the touch screen operating finger to press a button;
   a body of which a position is controlled in a three-dimensional coordinate system such that the vision camera, the ultrasonic wave radiator, the touch screen operating finger, and the button operating finger are mounted to the body; and
   a driving unit, which comprises
      a vacuum proportional control valve receiving and transmitting driving air according to a supplied current;
      a solenoid valve disposed at a downstream side of the vacuum proportional control valve to open or close a passage through which the driving air passes; and
      a finger cylinder respectively moving the button operating finger or the touch screen operating finger by the driving air supplied through the solenoid valve,
   so as to push forwardly or pull backwardly the touch screen operating finger and the button operating finger;
   wherein a controller supplies the driving air to the vacuum proportional control valve;
   wherein the touch screen operating finger and the button operating finger have a size and a shape according to a worker's finger, and
   the touch screen operating finger operates by a force according to a worker's finger force.

2. The inspection system of claim 1, further comprising:
   a lamp mounted to a lower front side of the body and radiating light forwardly,
   wherein the button operating finger and touch screen operating finger are parallel with each other at an upper front side of the lamp.

3. The inspection system of claim 2, further comprising:
   a controller configured to control the vision camera, the ultrasonic wave radiator, the lamp, and the driving unit and to sense the front obstacle according to the reflected ultrasonic waves sensed by the ultrasonic wave radiator.

4. The inspection system of claim 3, wherein
   the controller controls a position of a robot arm to move the body toward one side of the vehicle, and adjusts a position of the body through the vision camera to move the button operating finger or the touch screen operating finger forwardly or backwardly according to control of the driving unit.

5. The inspection system of claim 3, further comprising:
   a load cell detecting a load applied to the button operating finger.

6. The inspection system of claim 5, wherein
   the controller moves the button operating finger backwardly by the load detected in the load cell.

7. The inspection system of claim 3, further comprising:
   a load cell detecting a load applied to the touch screen operating finger.

8. The inspection system of claim 7, wherein
   the controller moves the touch screen operating finger backwardly by the load detected in the load cell.

9. The inspection system of claim 1, further comprising:
   a finger back detecting sensor detecting a backward motion of the button operating finger or the touch screen operating finger.

10. The inspection system of claim 1, wherein
    the proportional control valve proportionally increases or decreases a pressure of the supplied driving air according to the supplied current.

11. The inspection system of claim 1, wherein the touch screen operating finger and the button operating finger are made of a rubber, a silicone, or a plastic material.

12. An inspection method using the inspection system of claim 1 for the electronic device of the vehicle, comprising:
    moving, by the controller, the inspection system by using a robot arm;
    detecting, by the controller, the front obstacle by sensing the ultrasonic waves reflected from the front obstacle;
    adjusting, by the controller, a position of the touch screen or the button to a reference position through the vision camera;
    operating, by the controller, the touch screen or the button by controlling the driving unit including the vacuum proportional control valve to press with the touch screen operating finger or the button operating finger;
    detecting, by the controller, an operation of the touch screen or the button;
    moving, by the controller, the touch screen operating finger or the button operating finger backwardly after detecting the operation;
    detecting a load applied to the touch screen operating finger or the button operating finger by a load cell; and
    determining that the operation of the touch screen or the button as the load applied.

13. The inspection method of claim 12, further comprising:
  radiating light by a lamp.

* * * * *